US012617124B2

(12) United States Patent
Zhang et al.

(10) Patent No.: US 12,617,124 B2
(45) Date of Patent: May 5, 2026

(54) HOMOGENIZING METHOD AND DEVICE FOR MIXING COW DUNG GRANULES INTO CLAY BRICKS

(71) Applicants: Inner Mongolia University of Technology, Hohhot (CN); Inner Mongolian Grand Architecture Design CO., LTD., Hohhot (CN)

(72) Inventors: Pengju Zhang, Hohhot (CN); Lagenbaier Zha, Hohhot (CN); Liangang Tong, Hohhot (CN); Hehada Hu, Hohhot (CN)

( * ) Notice: Subject to any disclaimer, the term of this patent is extended or adjusted under 35 U.S.C. 154(b) by 198 days.

(21) Appl. No.: 18/378,595

(22) Filed: Oct. 10, 2023

(65) Prior Publication Data

US 2024/0042648 A1      Feb. 8, 2024

(30) Foreign Application Priority Data

Aug. 28, 2023      (CN) .......................... 202311096495.8

(51) Int. Cl.
| | |
|---|---|
| *B28C 1/16* | (2006.01) |
| *B28C 3/00* | (2006.01) |
| *C04B 33/04* | (2006.01) |
| *C04B 33/132* | (2006.01) |
| *C04B 33/32* | (2006.01) |
| *C04B 38/06* | (2006.01) |
| *B28B 1/16* | (2006.01) |

(52) U.S. Cl.
CPC ................. *B28C 1/16* (2013.01); *B28C 3/00* (2013.01); *C04B 33/04* (2013.01); *C04B 33/132* (2013.01); *C04B 33/32* (2013.01); *C04B 38/0665* (2013.01); *B28B 1/16* (2013.01)

(58) Field of Classification Search
CPC .... B28B 1/16; B28C 1/16; B28C 3/00; B32B 18/00; C04B 2235/3208; C04B 2235/3427; C04B 2235/444; C04B 2237/341; C04B 2237/586; C04B 33/04; C04B 33/132; C04B 33/1352; C04B 33/138; C04B 33/32; C04B 35/62655; C04B 35/6316; C04B 38/0061; C04B 38/0074; C04B 38/0665
USPC ................... 366/38, 76.3, 76.6, 156.1, 179.1
See application file for complete search history.

(56) References Cited

U.S. PATENT DOCUMENTS

| | | | | |
|---|---|---|---|---|
| 458,495 | A * | 8/1891 | Ring ................. | B01F 35/71775 |
| | | | | 366/156.1 |
| 3,051,454 | A * | 8/1962 | Goos ..................... | B01F 25/743 |
| | | | | 366/156.1 |
| 3,295,834 | A * | 1/1967 | Bendle ................... | A23P 30/40 |
| | | | | 366/156.1 |

(Continued)

*Primary Examiner* — David L Sorkin

(57) ABSTRACT

A pore-forming microsphere homogenizing device and method include steps of: firstly homogenizing the pore-forming microspheres made of the cow dung into the clay paste; secondly homogenizing the materials by using the kneading gear and the ejection cylinder rotating in opposite directions for kneading the clay paste while ejecting the pore-forming microspheres; and thirdly homogenizing the materials by using the telescopic kneading part and the ejection cylinder together for further kneading the clay paste while ejecting the pore-forming microspheres. With the foregoing processes, uniform and complete closed pores are uniformly distributed in the clay bricks, so that the strength of the clay bricks remains unchanged while clay usage is reduced.

6 Claims, 8 Drawing Sheets

(56)                    References Cited

U.S. PATENT DOCUMENTS 4,460,277 A * 7/1984 Schulz ............... B29B 17/0412
                                                        366/186

* cited by examiner

I 54 51 53 41 59 58

52 42 56 57

1

HOMOGENIZING METHOD AND DEVICE FOR MIXING COW DUNG GRANULES INTO CLAY BRICKS

CROSS REFERENCE OF RELATED APPLICATION

The present invention claims priority under 35 U.S.C. 119(a-d) to CN 202311096495.8, filed Aug. 28, 2023.

BACKGROUND OF THE PRESENT INVENTION

Field of Invention

The present invention relates to clay bricks, and more particularly to a homogenizing method and a homogenizing device for mixing cow dung granules into clay bricks.

Description of Related Arts

The mass production of clay bricks will inevitably consume a large amount of high-quality clay resources, and therefore attempts have been made to try to find processes and materials to reduce clay usage without reducing brick strength. As a result, people tried to reduce the cost of clay bricks in two aspects: reducing the sintering energy and reducing the clay usage. Cow dung has a stable fiber content (60% of dry cow dung), and dry cow dung such as dry cow dung granules can be used as a substitute for internal combustion coal and can be added to the bricks to reduce the clay usage. However, the density of crushed cow dung granules is lighter than that of sand or clay, and cow dung granules are fragile, so it is very difficult to uniformly mix the cow dung granules into the clay paste.

In the prior art, Hongya Qinggangping Brick Machine Factory discloses a method of preparing bricks (Chinese patent CN104609836A, publication date: May 13, 2015), comprising steps of: A: crushing 55%-62% shale and 27%-32% gangue according to mass portions, and sifting to form a first mixture; B: adding 10%-15% cow dung to the first mixture, and thoroughly stirring to form an initial mixture; and C: billeting and sintering the initial mixture to obtain bricks. The bricks obtained are lighter than conventional bricks, which adopts cow dung instead of internal combustion coal to shorten the sintering time substantially relative to the conventional process, as well as effectively save the cost by 0.01 RMB per brick. However, how the cow dung is uniformly distributed in the first mixture is not disclosed. If the cow dung is concentrated in a certain place in the brick, the compressive strength of the clay brick will be greatly reduced at that place.

Hefei Linuo New Materials Trade Co., Ltd. discloses a terracotta sand-based permeable brick and a production method thereof (Chinese patent CN105418141A, publication date: Mar. 23, 2016), comprising steps of: (1) drying lemon peel, livestock manure and pine needles, and carbonizing in a carbonization furnace at a temperature of 450-500° C. for 20-30 minutes without air; cooling to room temperature, then adding nano titanium dioxide and waste white mineral oil to grind for 40-50 minutes to get carbon black material I; (2) washing sugar filter mud and drying, sending to a high-speed mixer and adding hydroxypropyl methyl cellulose, sodium gluconate and an appropriate amount of water; performing high-speed mixing before drying; and ultrasonic grinding into powder then drying to get sugar filter mud powder II; (3) washing desert sand and drying before adding bentonite clay, terracotta and copper tailings; calcining at a high temperature of 670-700° C. and crushing to 120-140 meshes; adding the carbon black material I, the sugar filter mud powder II and other ingredients, and thoroughly mixing; milling in a ball mill for 2-3 hours, then granulating with water spray, and aging for 2 days before pressing into raw brick blanks; and (4) naturally drying the raw brick blanks, then sintering in a box-type resistance furnace at 1060-1100° C. for 1-2 hours; and naturally cooled to room temperature to finish production. The compressive strength of the sand-based permeable brick is 47.7 MPa, the water permeability coefficient is 0.087 cm/s, and the water retention is 0.756 g/cm$^2$. The strength and flexural properties of the product are significantly improved without affecting the water permeability of the brick body, and the raw material utilization rate is high. However, because of the great density difference between carbon black material, bentonite clay, terracotta, copper tailings, and desert sand, they are not easy to be mixed. The disclosure has not been improved on how to ensure uniform mixing, and cow dung and sugar filter mud need to be carbonized during the brick making process, which together make the process complex, and increase the energy consumption.

Therefore, there is an urgent need for a novel brick-making process, since how to uniformly mix the cow dung granules into the brick clay to reduce clay usage without reducing the clay brick strength for replacing the conventional clay bricks has become a key challenge for the breakthrough of the conventional clay brick technology.

SUMMARY OF THE PRESENT INVENTION

In view of the above defects in the prior art, an object of the present invention is to provide a homogenizing method and a homogenizing device for mixing cow dung granules into clay bricks, which can uniformly mix the cow dung granules into the clay bricks to reduce clay usage without reducing clay brick strength.

Accordingly, in order to accomplish the above object, the present invention provides a homogenizing method for mixing cow dung granules into clay bricks, comprising steps of:

S1: preparing pore-forming microspheres for sintering the clay bricks, wherein the pore-forming microspheres are prepared by mixing the cow dung granules with a light-strength modifier, and have a diameter of 0.5 mm-1.5 mm;

S2: preparing clay paste by mixing clay brick components in proportion;

S3: uniformly doping the pore-forming microspheres into the clay paste to obtain ball-doped paste;

S4: molding one of the clay paste and the ball-doped paste as a core layer and the other as a covering layer outside the core layer, thereby obtaining clay brick blanks; and S5: drying the clay brick blanks and then sintering the clay brick blanks in a sintering kiln to obtain the clay bricks.

Preferably, in the step S1, the pore-forming microspheres are prepared by specific steps of:

S11: processing cow dung with a ball mill;

wherein the cow dung is dried and sent into the ball mill for crushing and sifting to obtain the cow dung granules;

S12: preparing a pasty fluid;

wherein 20-35 wt % the light-strength modifier is mixed with 20-40 wt % water to obtain a light-strength modifier base fluid; and 35-55 wt % the cow dung granules are added to the light-strength modifier base fluid and stirred for 30 minutes to obtain the pasty fluid; and S13: preparing the pore-forming microspheres;

wherein the pasty fluid is fed into a centrifugal atomizing device and atomized at a certain speed to form liquid droplets; the liquid droplets fall freely and pass through a hot air stream to form the pore-forming microspheres.

Preferably, the light-strength modifier comprises 10-45 wt % of coated micronized powder, 2-5 wt % of anhydrous calcium chloride, and 55-75 wt % of binder, wherein the binder is silicate cement or water glass, and the coated micronized powder comprises fly ash, blast-furnace slag, and volcanic ash.

The present invention further provides a clay brick prepared by the homogenizing method, comprising a clay brick blank made from clay paste with a brick making machine, wherein the clay brick blank comprises a core layer, a covering layer and a plurality of pore-forming microspheres; both the core layer and the covering layer comprises a clay substrate, and the pore-forming microspheres are uniformly dispersed in the clay substrate of the core layer or the covering layer, so that a closed porous structure is formed in the clay substrate after layer sintering; a porosity of the closed porous structure is less than or equal to 40%.

The present invention further provides a homogenizing device for uniformly doping pore-forming microspheres into clay paste, comprising:

a concave cavity housing, wherein the concave cavity housing comprises an annular flow channel; a channel inlet and a channel outlet in connection with the flow channel are arranged on the concave cavity housing;

a paste driving part for driving the clay paste to pass through the flow channel; and a kneading ejection part rotationally coupled in coaxial line with the flow channel, wherein a rotating direction of the kneading ejection part is opposite to a moving direction of the clay paste, thereby intermittently ejecting the pore-forming microspheres into the clay paste while kneading the clay paste.

Preferably, the kneading ejection part comprises a kneading gear cylinder and a granule ejection cylinder rotating in opposite directions to each other, wherein the granule ejection cylinder is arranged in a cylinder cavity of the kneading gear cylinder and rotates opposite to the kneading gear cylinder; and a gap between the granule ejection cylinder and the kneading gear cylinder is smaller than a diameter of the pore-forming microspheres.

Preferably, the concave cavity housing comprises a stepped sleeve, wherein an outer bearing seat and an inner bearing seat are coaxially arranged on the stepped sleeve; the granule ejection cylinder is rotatably arranged on the inner bearing seat, and the kneading gear cylinder is rotatably arranged on the outer bearing seat; a bottom plate and a cover plate are respectively fastened to two ends of the stepped sleeve; the bottom plate is provided with a first motor, and the cover plate is mounted with a second motor; the kneading gear cylinder is driven by and connected to the first motor, and the granule ejection cylinder is driven by and connected to the second motor.

Preferably, a plurality of ejection holes are arrayed on a peripheral wall the granule ejection cylinder; the kneading gear cylinder comprises a kneading gear; the kneading gear has at least one ejection outlet extending in a radial direction, and the ejection outlet corresponds to the ejection holes.

Preferably, the kneading gear cylinder is provided with a plurality of sliding kneading parts spaced in a circumferential direction, and the granule ejection cylinder rotates opposite to the kneading gear cylinder so that the sliding kneading parts radially slide and telescopically knead to eject the pore-forming microspheres into the clay paste.

Preferably, the sliding kneading parts comprise a plurality of sliding holes provided in the kneading gear cylinder, and telescopic kneading teeth are provided in the sliding holes; reset springs and limiting balls are arranged between the telescopic kneading teeth and the sliding holes; the telescopic kneading teeth move between extended and retracted positions in the sliding holes, wherein the reset springs drive the telescopic kneading teeth back to the retracted positions, and the limiting balls restrict the telescopic kneading teeth from falling out of the sliding holes; the telescopic kneading teeth have telescopic ejection ports;

the sliding kneading parts further comprise cams, wherein the cams are provided on a periphery of the granule ejection cylinder; highest cam points are arranged on cams corresponding to odd-numbered kneading teeth, and lowest cam points are arranged on cams corresponding to even-numbered kneading teeth;

when the granule ejection cylinder rotates opposite to the kneading gear cylinder, the highest cam points force the odd-numbered kneading teeth to extend and knead while the ejection holes aim at the telescopic ejection ports of the telescopic kneading teeth, which throw out the pore-forming microspheres to the telescopic ejection outlet, so that the pore-forming microspheres are ejected into the clay paste by the kneading gear cylinder; meanwhile, the reset springs drive the even-numbered kneading teeth to move along the cams until reaching the lowest cam points, so that the even-numbered kneading teeth move back to the retracted positions.

The pore-forming microsphere homogenizing device and method of the present invention firstly homogenize the pore-forming microspheres made of the cow dung into the clay paste; secondly homogenize the materials by using the kneading gear and the ejection cylinder rotating in opposite directions for kneading the clay paste while ejecting the pore-forming microspheres; and thirdly homogenize the materials by using the telescopic kneading part and the ejection cylinder together for further kneading the clay paste while ejecting the pore-forming microspheres. As a result, uniform and complete closed pores are uniformly distributed in the clay bricks, so that the strength of the clay bricks remains unchanged while clay usage is reduced.

ELEMENT REFERENCE

Figure 1:
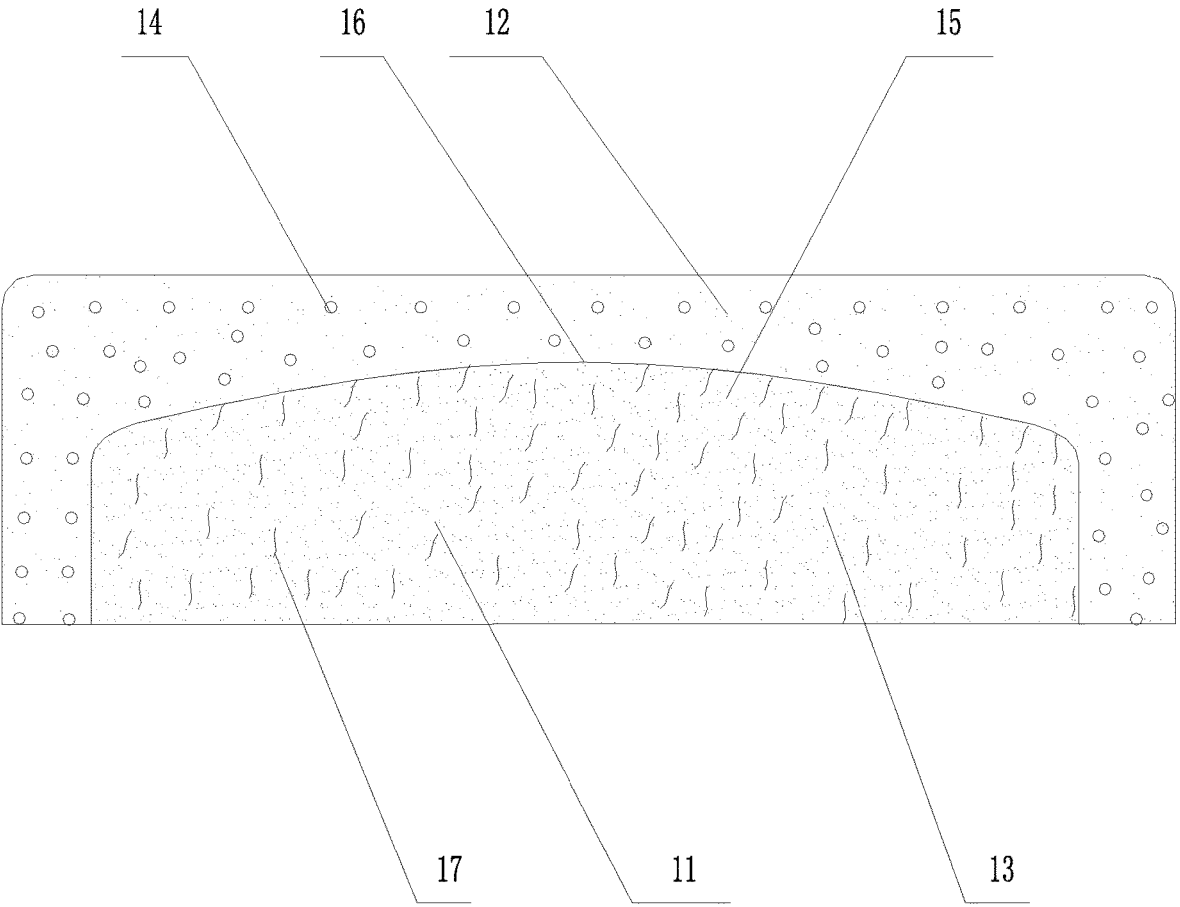
FIG. 1 is a cross-sectional view of a clay brick prepared by a homogenizing method for mixing cow dung granules into clay bricks according to the present invention.
Figure 2:
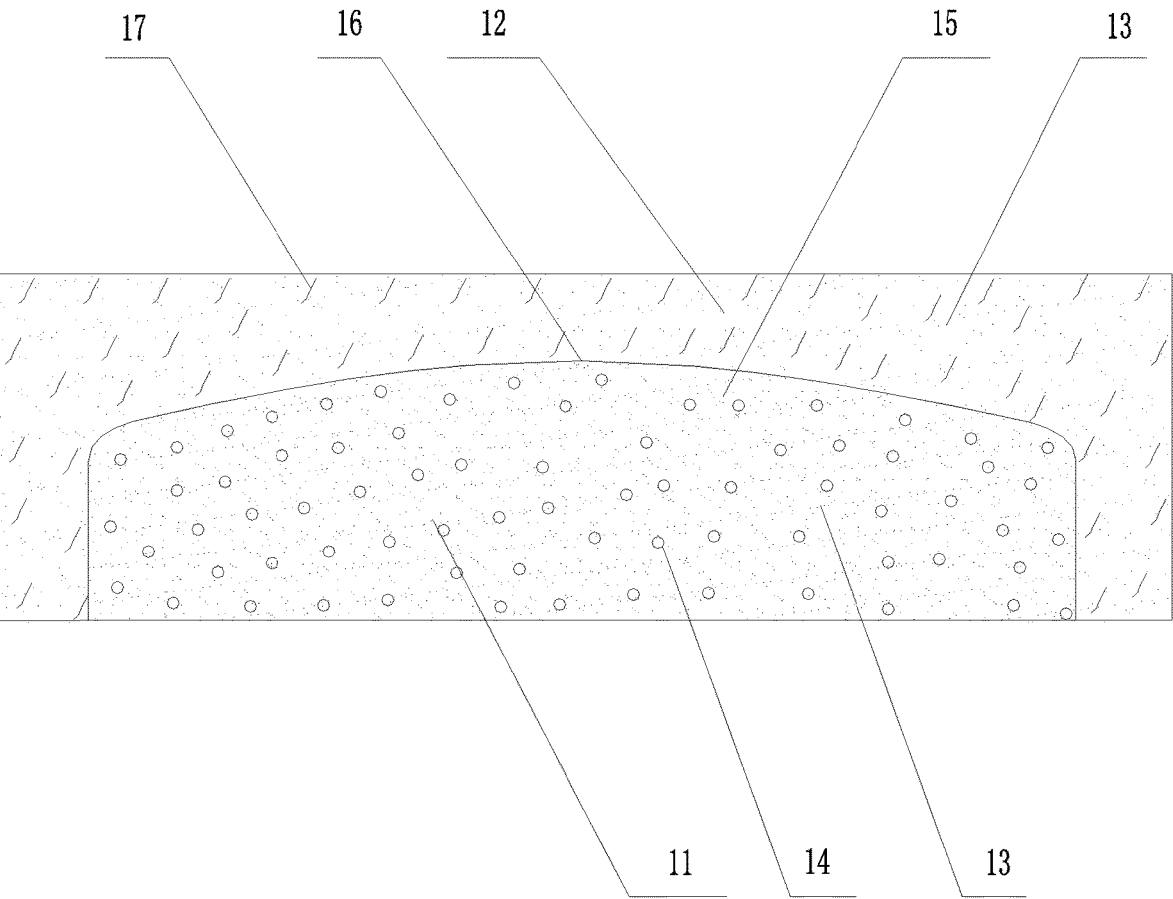
FIG. 2 is a cross-sectional view of a clay brick prepared by a homogenizing method for mixing cow dung granules into clay bricks according to another embodiment of the present invention.
Figure 3:
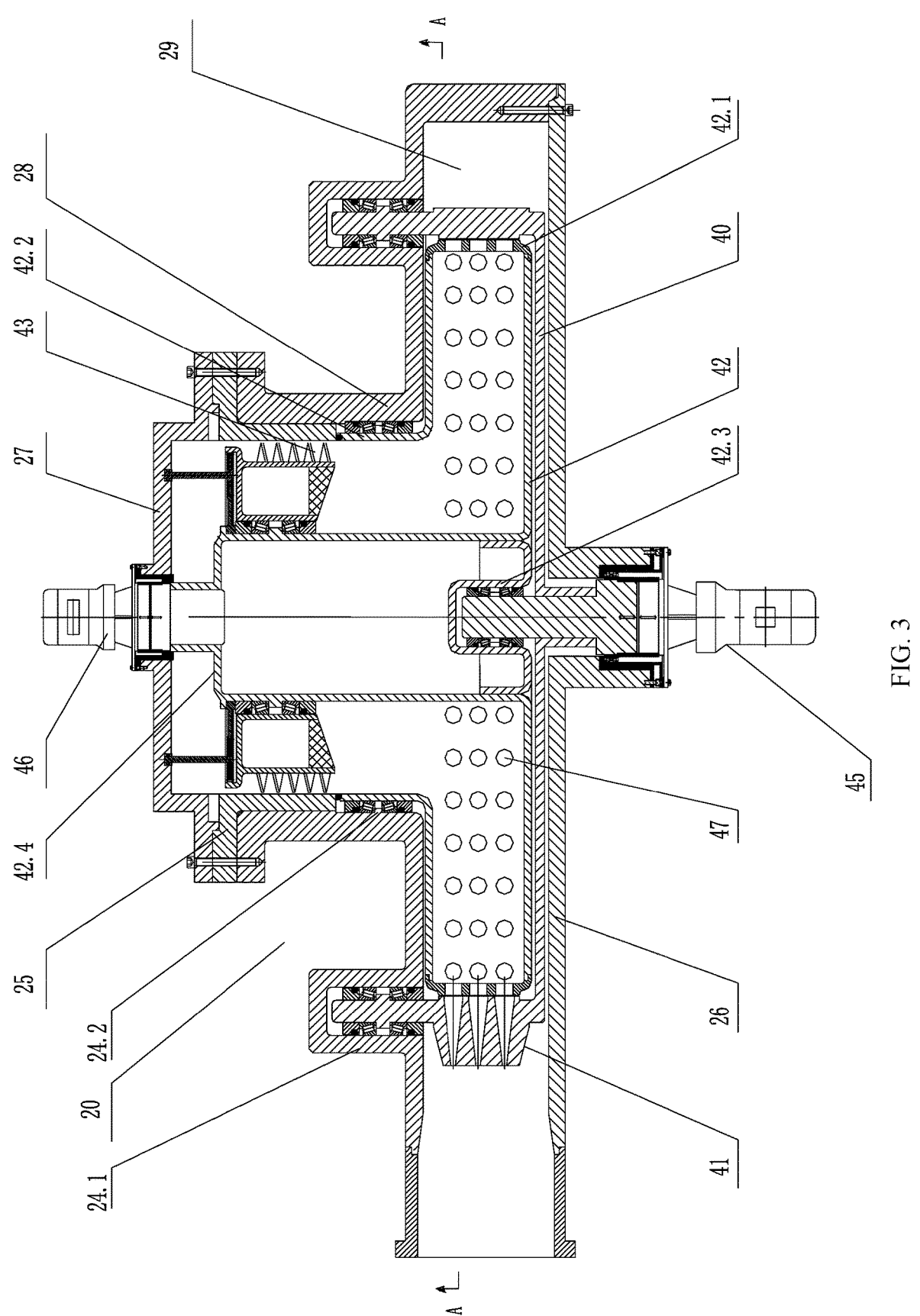
FIG. 3 is a cross-sectional view of a homogenizing device for mixing cow dung granules into clay bricks according to an embodiment 1 of the present invention.
Figure 4:
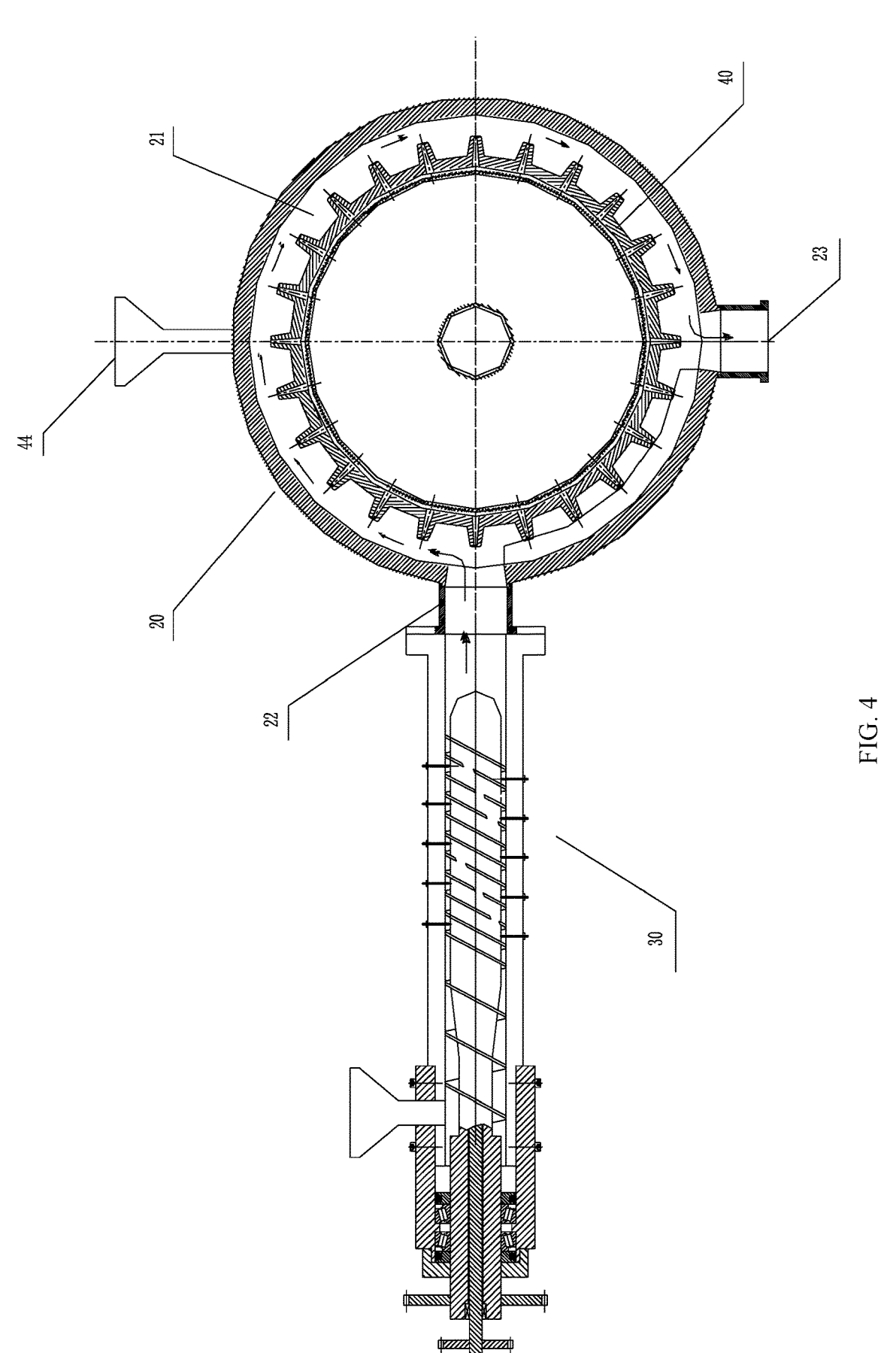
FIG. 4 is an A-A cross-sectional view of a granule ejection cylinder in FIG. 3 of the homogenizing device for mixing the cow dung granules into the clay bricks according to the embodiment 1 of the present invention.
Figure 5:
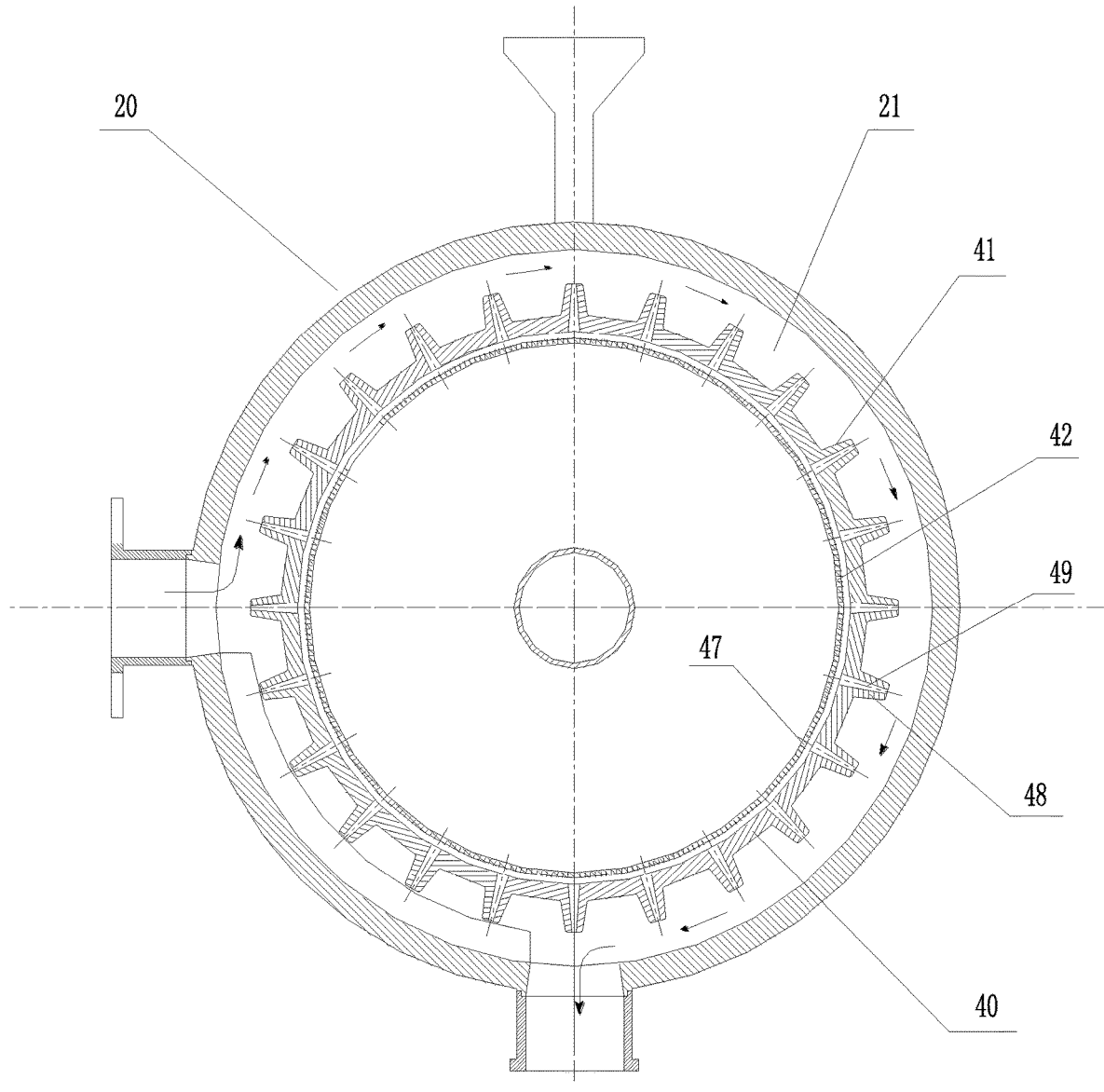
FIG. 5 is a sketch view of the homogenizing device for mixing the cow dung granules into the clay bricks according to the embodiment 1 of the present invention when ejection holes aim at telescopic ejection ports.
Figure 6:
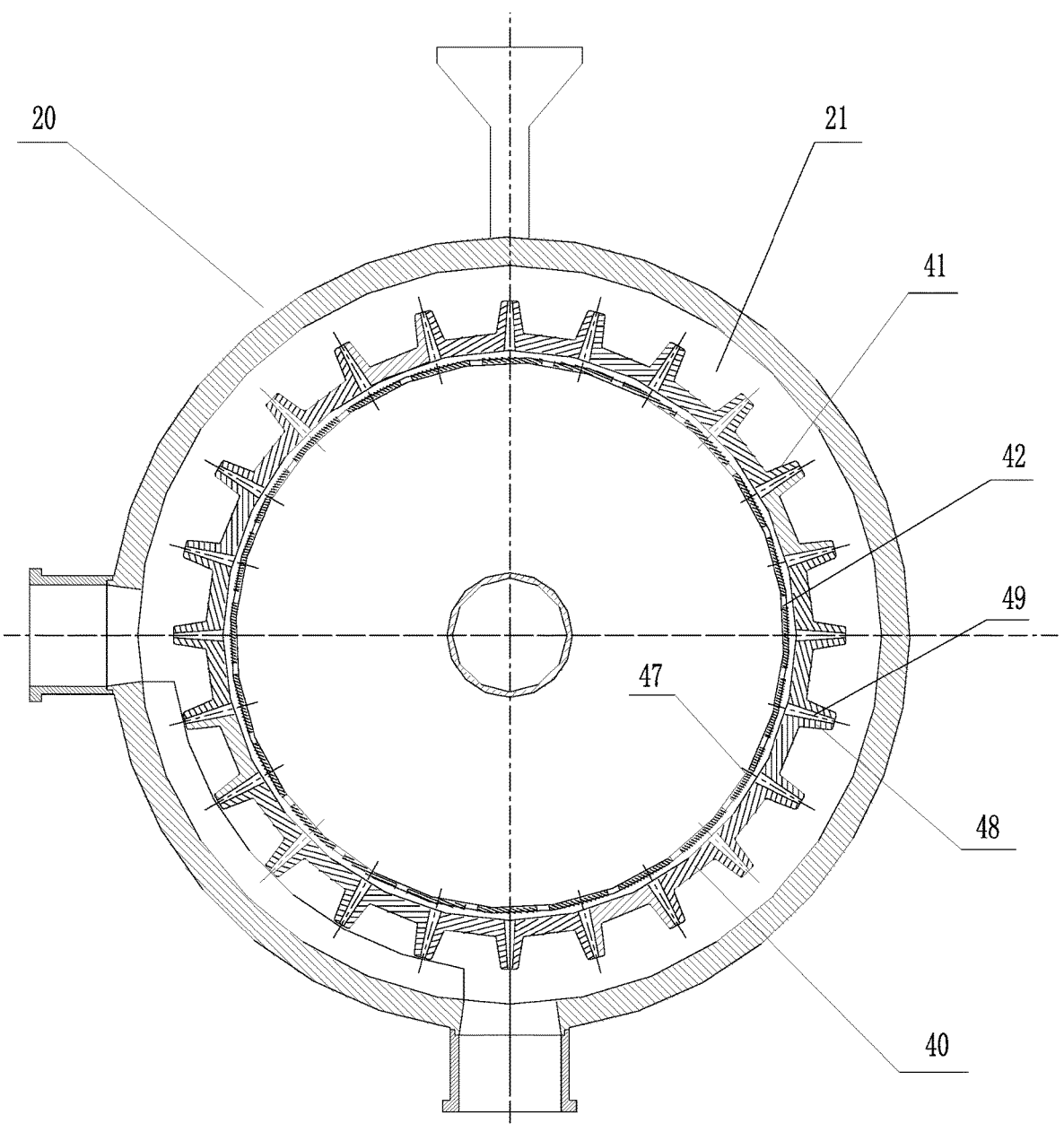
FIG. 6 is a sketch view of the homogenizing device for mixing the cow dung granules into the clay bricks according to the embodiment 1 of the present invention when the ejection holes are located between two telescopic ejection ports.
Figure 7:
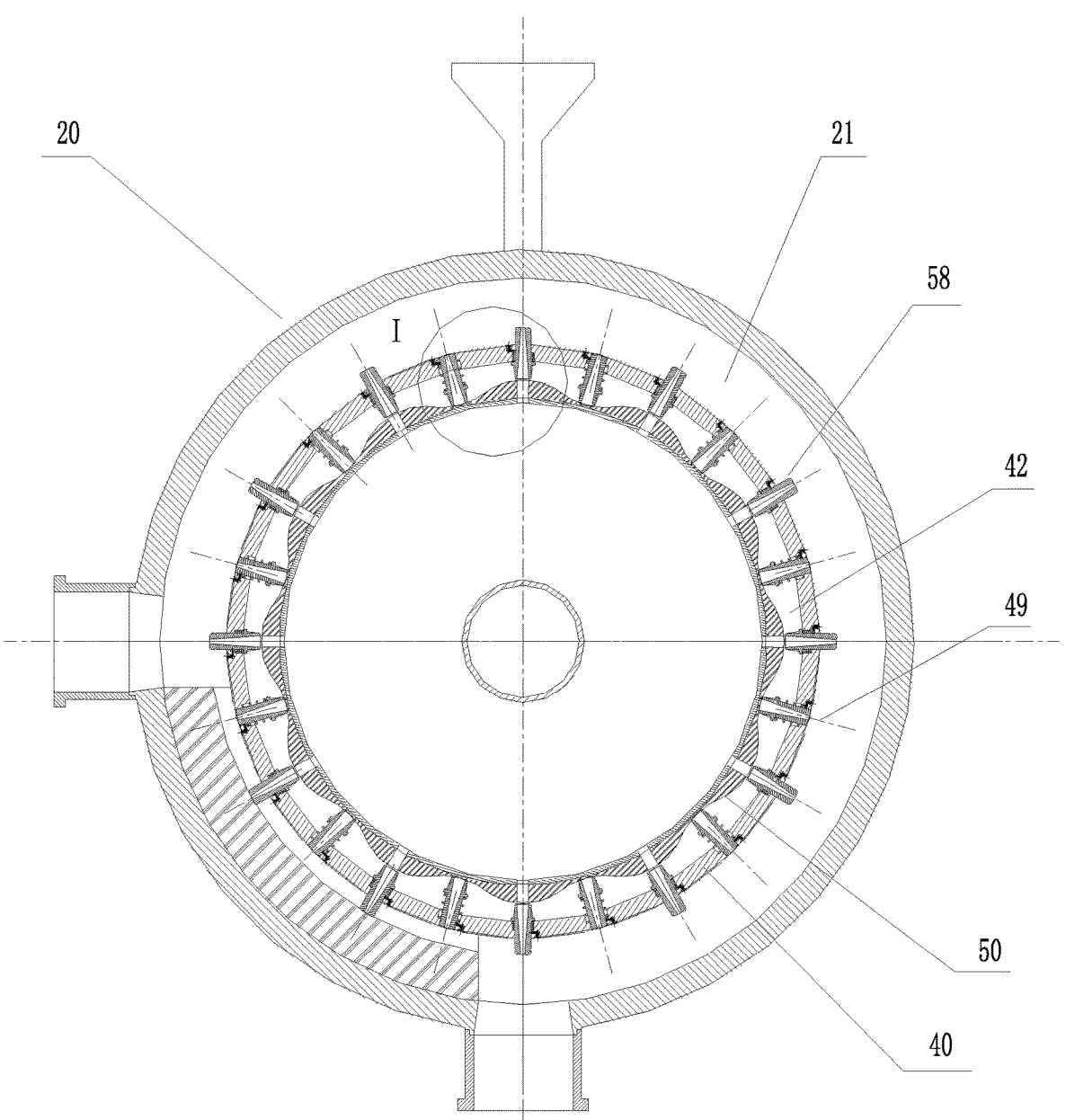
FIG. 7 is a cross-sectional view of the homogenizing device for mixing the cow dung granules into the clay bricks according to an embodiment 2 of the present invention.
Figure 8:
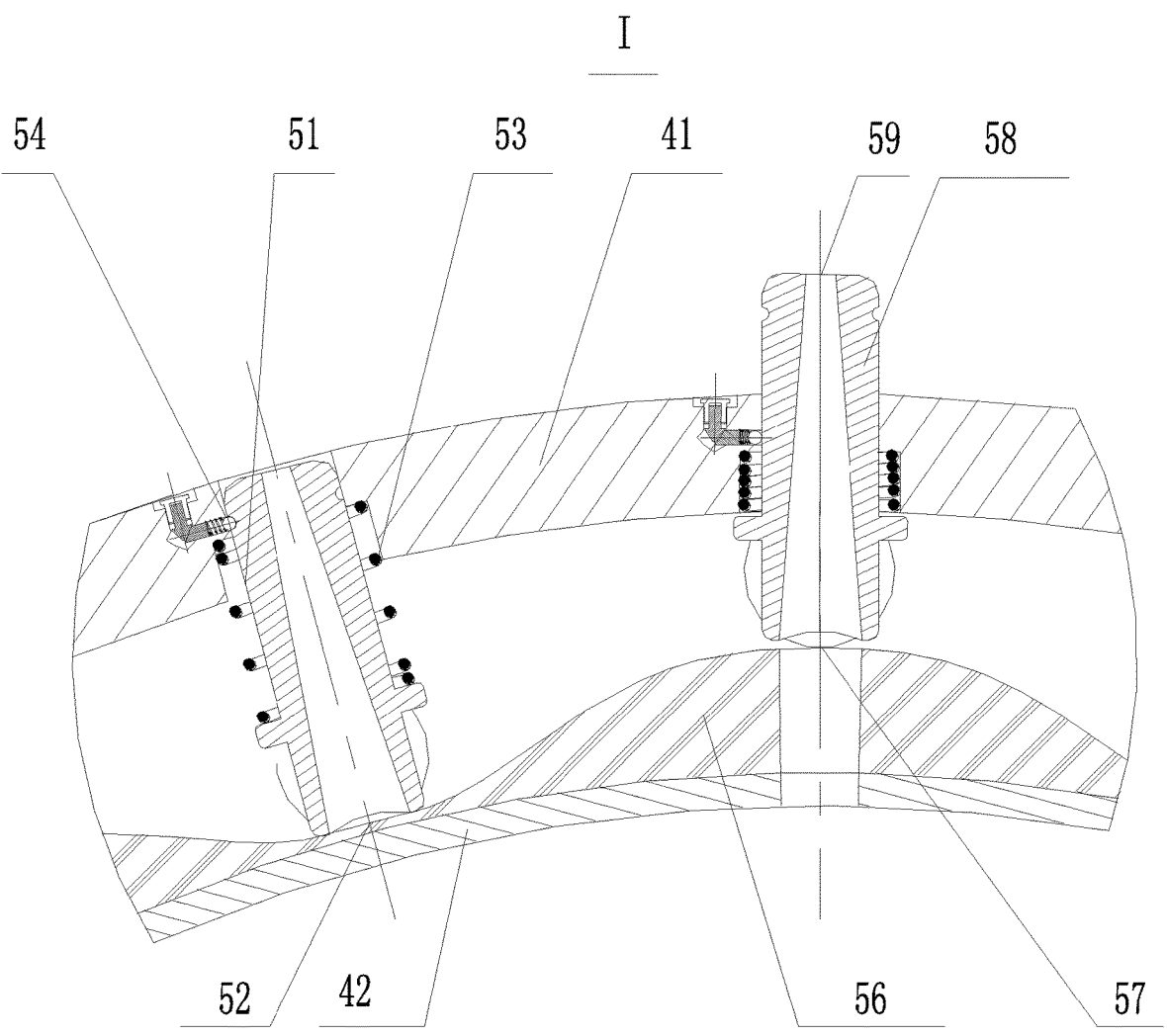
FIG. 8 is an enlarged view of part I in FIG. 7 of the homogenizing device for mixing the cow dung granules into the clay bricks according to the embodiment 2 of the present invention.

10—sintered clay brick, 11—core layer, 12—covering layer, 13—clay substrate, 14—pore-forming microspheres, 15—pressure-bearing convex part, 16—concave cylindrical surface;

20—concave cavity housing, 21—annular flow channel, 22—channel inlet, 23—channel outlet, 24—stepped sleeve, 25—infeed sleeve, 26—bottom plate, 27—cover plate, 28—sealing cylinder, 29—circular cavity;

30—driving part;

40—kneading ejection part, 41—kneading gear cylinder, 42—granule ejection cylinder, 43—conveying screw, 44—hopper, 45—first motor, 46—second motor, 47—ejection hole, 48—kneading gear, 49—ejection outlet;

50—sliding kneading part, 51—sliding hole, 52—lowest cam point, 53—reset spring, 54—limiting ball, 56—cam, 57—highest cam point, 58—telescopic kneading teeth, 59—telescoping ejection port;

24.1—outer bearing seat, 24.2—inner bearing seat, 42.1—large-diameter cylinder body, 42.2—small-diameter cylinder body, 42.3—inner concave bearing housing, 42.4—ejection cylinder drive shaft.

DETAILED DESCRIPTION OF THE PREFERRED EMBODIMENT

The following embodiments of the present invention are described in detail in connection with the accompanying drawings, which are not intended to limit the scope of the present invention.

Embodiment 1

A homogenizing method for mixing cow dung granules into clay bricks is provided, comprising steps of:

S1: preparing pore-forming microspheres for sintering the clay bricks, wherein the pore-forming microspheres are prepared by mixing the cow dung granules with a light-strength modifier, and have a diameter of 0.5 mm-1.5 mm;

S2: preparing clay paste by mixing clay brick components in proportion;

S3: uniformly doping the pore-forming microspheres; wherein the clay paste in a flow channel for kneading as well as intermittently ejecting the pore-forming microspheres into the clay paste to obtain a ball-doped paste;

S4: molding one of the clay paste and the ball-doped paste as a core layer and the other as a covering layer outside the core layer, thereby obtaining clay brick blanks; and S5: drying the clay brick blanks and then sintering the clay brick blanks in a sintering kiln to obtain the clay bricks.

In the step S1, the pore-forming microspheres are prepared by specific steps of:

S11: processing cow dung with a ball mill;

wherein collected cow dung is naturally dried and then placed in an oven at 50-70° C. before processing, so as to obtain dried cow dung and ensure that a moisture content of the cow dung is less than 7%;

the dried cow dung is sent into the ball mill for crushing and sifting with a sieve mesh of greater than or equal to 70 mesh, so as to obtain cow dung granules with an average granule size of less than 0.1 mm;

S12: preparing a pasty fluid;

wherein 20-35 wt % the light-strength modifier is mixed with 20-40 wt % water to obtain a light-strength modifier base fluid; and 35-55 wt % the cow dung granules are added to the light-strength modifier base fluid and stirred for 30 minutes to obtain the pasty fluid; and S13: preparing the pore-forming microspheres;

wherein the pasty fluid is fed into a centrifugal atomizing device and atomized at a certain speed to form liquid droplets; the droplets are sprayed in a forming tower, and a 100° C.-120° C. hot airflow passes through the forming tower from bottom to top, ensuring that the microspheres are in contact with a countercurrent of the hot airflow at a height of at least 2 m, so that the droplets rapidly lose moisture and form weight-reduced reinforced microspheres; it is ensured that the moisture content of the collected weight-reduced reinforced microspheres is 10 wt % or less to obtain the pore-forming microspheres; and a D90 granule size of the pore-forming microspheres is 0.5 mm-1.5 mm.

A main component of the dried cow dung is cellulose, so the pore-forming microspheres will burn to ash during subsequent sintering, leaving that part of the clay substrate with a closed porous structure.

The light-strength modifier comprises 10-45 wt % of coated micronized powder, 2-5 wt % of anhydrous calcium chloride, and 55-75 wt % of binder. The binder is silicate cement or water glass. The coated micronized powder is lightweight micronized powder which is easy to combine with the clay substrate, comprising fly ash, blast-furnace slag, and volcanic ash. An average granule size of the coated micronized powder is 0.01 mm-0.1 mm. The light-strength modifier is a powder product packaged in bags. In a paste fluid, a role of the coated micronized powder is to adhere around the cow dung granules with a binder, so as to form the pore-forming microspheres of suitable granule size when the liquid droplets are formed by atomizing.

A weight-reduced reinforced sintered clay brick 10 is prepared by the above homogenizing method, comprising a clay brick blank made from clay paste with a brick making machine, wherein the clay brick blank comprises a core layer 11, a covering layer 12 and a plurality of pore-forming microspheres 14; both the core layer 11 and the covering layer 12 comprises a clay substrate 13, and the pore-forming microspheres 14 are uniformly dispersed in the clay substrate 13 of the core layer 11 or the covering layer 12, so that a closed porous structure is formed in the clay substrate after layer sintering; a porosity of the closed porous structure is less than or equal to 40%.

The clay substrate 13 is formulated with conventional clay brick materials, but does not contain components that will disappear during high-temperature sintering, such as gangue.

Judging from a total weight of the clay bricks, a volume up to 5-10 wt % of the total weight of the clay bricks is converted a quantitative amount of the pore-forming microspheres, and the pore-forming microspheres is then uniformly dispersed in the clay substrate 13 by the homogenizing device.

In order to form a suitable pressure-bearing structure for the core layer 11, the core layer 11 comprises a pressure-bearing convex part 15. The pressure-bearing convex part 15 comprises a concave cylindrical surface 16 facing a top surface of the sintered clay brick 10.

Preferably, in order to enhance compressive strength, the clay substrate 13, which is not blended with the pore-forming microspheres, can be blended with 3-10 wt % basalt short-cut fibers. Although a cost of which is increased correspondingly, high-strength sintered clay bricks up to MU30 or more can be prepared.

When the porosity of the porous structure is less than or equal to 40% and the pore-forming microspheres have the diameter 0.5 mm-1.5 mm, the mechanical properties of the sintered clay brick are little affected. Preferably, the porosity is 35-40%, and the diameter of the weight-reduced reinforced microspheres is 0.8 mm-1 mm.

A method for preparing the weight-reduced reinforced sintered clay brick comprises steps of:

Step S1: preparing clay flow paste, wherein 65-85 wt % clay is mixed with water to form a paste fluid with a certain fluidity, thereby obtaining the clay flow paste;

Step S2: homogenizing, wherein 15-35 wt % pore-forming microspheres 14 are homogeneously mixed into the clay flow paste by the homogenizing device to obtain the ball-doped paste;

Step S3: pre-compressing into blanks, wherein the ball-doped paste and the clay paste are fed into a compression mold of the brick making machine to make the brick blanks;

Step S4: naturally cooling, wherein the brick blanks are palletized and naturally cooled for 3-5 days to ensure that the brick blanks are in a semi-dry state, thereby avoiding internal microcracks during sintering in the brick kiln; and Step S5: sintering, wherein the brick blanks are palletized in the sintering kiln, heated up to 100° C. at a rate of 20° C./hour, and then heated up to 1100° C.-1200° C. at a rate of 100° C./hour; the temperature is maintained constant for 3-5 hours before stopping heating and naturally cooling the brick blanks in the sintering kiln for 1-2 days; finally the brick blanks are taken out of the sintering kiln.

The step S3 further comprises steps of:

sending one of the ball-doped paste and the clay paste into a first mold, wherein a mold bottom plate does not move, and the first mold is fastened to the mold bottom plate; the paste is pressed and molded into the core layer 11, and the inner core layer 11 is placed on the bottom plate of the first mold; and removing the first mold and fastening the second mold to the mold bottom plate, so that the core layer 11 serves as an embedded part of the second mold; sending the other paste into the second mold and forming the covering layer 12 outside of the core layer 11, so as to obtain the brick blank.

Compared with ordinary sintered clay bricks of the same size, the weight-reduced reinforced sintered clay brick has a closed porous structure in the core layer 11 or the covering layer 12. The compressive strength is not reduced, so the compressive strength of the sintered clay brick is greater than or equal to the ordinary sintered clay bricks, but the weight is reduced by 10-25%. That is to say, 10-25% of the clay is replaced with the pore-forming microspheres 14, which forms the closed porous structure after sintering.

Since the pore-forming microspheres are bonded granules rather than sintered granules, the strength is limited. By stirring and mixing, uniform mixing can be realized, but most of the pore-forming microspheres will be crushed into powder by high-speed rotating stirring blades and then mixed in the clay flow paste, which affects the closed-pore structure of the closed porous structure. In order to enhance homogenizing characteristics and the closed porous structure, the following improvements are made.

A homogenizing device for uniformly doping pore-forming microspheres into clay paste comprises:

a concave cavity housing 20, wherein the concave cavity housing 20 comprises an annular flow channel 21; a channel inlet 22 and a channel outlet 23 in connection with the flow channel 21 are arranged on the concave cavity housing 20;

a paste driving part 30 for driving the clay paste to pass through the flow channel 21; and a kneading ejection part 40 rotationally coupled in coaxial line with the flow channel 21, wherein a rotating direction of the kneading ejection part 40 is opposite to a moving direction of the clay paste, thereby intermittently ejecting the pore-forming microspheres into the clay paste while kneading the clay paste.

The concave cavity housing 20 comprises a stepped sleeve 24 and an infeed sleeve 25. The stepped sleeve 24 comprises a large diameter sleeve portion, a small diameter sleeve portion, and a transition top wall integrally connecting the two. An outer bearing seat 24.1 and an inner bearing seat 24.2 are coaxially arranged on the stepped sleeve 24, and the infeed sleeve 25 is disposed in the small diameter sleeve portion.

The kneading ejection part 40 comprises a kneading gear cylinder 41 and a granule ejection cylinder 42 rotating in opposite directions to each other. The granule ejection cylinder 42 is rotatably arranged on the inner bearing seat 24.2, and the kneading gear cylinder 41 is rotatably arranged on the outer bearing seat 24.1. The granule ejection cylinder 42 is arranged in a cylinder cavity of the kneading gear cylinder 41 and rotates opposite to the kneading gear cylinder 41; and a gap δ between the granule ejection cylinder 42 and the kneading gear cylinder 41 is smaller than a diameter of the pore-forming microspheres. A bottom plate 26 and a cover plate 27 are respectively fastened to two ends of the stepped sleeve 24; the bottom plate 26 is provided with a first motor 45, and the cover plate 27 is mounted with a second motor 46; the kneading gear cylinder 41 is driven by and connected to the first motor 45, and the granule ejection cylinder 42 is driven by and connected to the second motor 46.

Specifically, a left bottom of the kneading gear cylinder 41 is fixed with a tooth cylinder drive shaft, and a drive end of the tooth cylinder drive shaft is coupled to the first motor 45 via a coupling; the granule ejection cylinder 42 comprises a large-diameter cylinder body 42.1 and a small-diameter cylinder body 42.2. An inner concave bearing housing 42.3 and an ejection cylinder drive shaft 42.4 are arranged on a bottom wall of the large-diameter cylinder body, wherein the inner concave bearing housing 42.3 extends along a rotational axis, and the ejection cylinder drive shaft 42.4 extends to a side of the small-diameter cylinder body 42.2. The cover plate 27 is fixed with the second motor 46 along the rotational axis, and the second motor 46 is connected to the ejection cylinder drive shaft 42.4 via a coupling. A free end of the tooth cylinder drive shaft is rotatably arranged in the inner concave bearing housing 42.3.

The infeed sleeve 25 is provided within the small diameter sleeve portion of the stepped sleeve 24, and a conveying screw 43 is provided between the infeed sleeve 25 and the ejection cylinder drive shaft. The conveying screw 43 is connected to the ejection cylinder drive shaft via a planetary gear reducer drive, and a hopper 44 is provided at a top of the infeed sleeve 25.

A coaxiality of the outer bearing seat 24.1 and the inner bearing seat 24.2 is less than or equal to 0.02 mm, while the cover plate 27 is coaxially snapped into the large diameter sleeve portion with a tapered fit portion.

A plurality of ejection holes 47 are arrayed on a peripheral wall the granule ejection cylinder 42, wherein there are multiple columns of the ejection holes 47 arranged along a circumferential direction with a column spacing $C_s$, and multiple rows along an axial direction with a row spacing $R_S$.

The kneading gear cylinder 41 comprises a kneading gear 48; the kneading gear 48 has at least one ejection outlet 49 extending in a radial direction, and the ejection outlet 49 corresponds to the ejection holes 47. The granule ejection cylinder 42 may rotate at a certain speed in an opposite direction with respect to the kneading gear cylinder 41, so that when a certain column of the ejection holes 47 aim at the ejection outlet 49 of a certain kneading gear 48, the column of the ejection holes 47 ejects pore-forming microspheres to the ejection outlet 49, and the pore-forming microspheres are thus thrown out by the kneading gear cylinder 41 into the clay paste. When the column of the ejection holes 47 continues to rotate and is between the ejection outlets of adjacent kneading gears 48, the pore-forming microspheres will not be ejected from the ejection holes 47.

The channel outlet 23 is at an angle of 270 degrees to the channel inlet 22.

Embodiment 2

An improved homogenizing method for mixing pore-forming microspheres into a clay substrate is provided, wherein other features are identical to those in the embodiment 1.

A pore-forming microsphere homogenizing device comprises:

a kneading ejection part 40, wherein the kneading ejection part 40 comprises a kneading gear cylinder 41 and a granule ejection cylinder 42 rotating in opposite directions to each other; the kneading gear cylinder 41 is provided with a plurality of sliding kneading parts 50 spaced in a circumferential direction, and the granule ejection cylinder 42 rotates opposite to the kneading gear cylinder 41 so that the sliding kneading parts 50 radially slide and telescopically knead to eject the pore-forming microspheres into the clay paste;

the sliding kneading parts 50 comprise a plurality of sliding holes 51 provided in the kneading gear cylinder 41, and telescopic kneading teeth 58 are provided in the sliding holes 51; reset springs 53 and limiting balls 54 are arranged between the telescopic kneading teeth 58 and the sliding holes 51; the telescopic kneading teeth 58 move between extended and retracted positions in the sliding holes 51, wherein the reset springs 53 drive the telescopic kneading teeth 58 back to the retracted positions, and the limiting balls 54 restrict the telescopic kneading teeth 58 from falling out of the sliding holes 51; the telescopic kneading teeth 58 have telescopic ejection ports 59;

cams 56 are provided on a periphery of the granule ejection cylinder 42; highest cam points 57 are arranged on cams corresponding to odd-numbered kneading teeth, and lowest cam points 52 are arranged on cams corresponding to even-numbered kneading teeth;

when the granule ejection cylinder 42 rotates opposite to the kneading gear cylinder 41, the highest cam points 57 force the odd-numbered kneading teeth to extend and knead while the ejection holes 47 aim at the telescopic ejection ports 59 of the telescopic kneading teeth 58, which throw out the pore-forming microspheres to the telescopic ejection outlet 49, so that the pore-forming microspheres are ejected into the clay paste by the kneading gear cylinder 41; meanwhile, the reset springs 53 drive the even-numbered kneading teeth to move along the cams 56 until reaching the lowest cam points 52, so that the even-numbered kneading teeth move back to the retracted positions.

In order to solve the technical problem of "how to uniformly mix the cow dung granules into the brick clay to reduce clay usage without reducing the clay brick strength for replacing the conventional clay bricks", the homogenizing method and homogenizing device of the present invention adopt the following innovative ideas:

(1) The cow dung is first made into pore-forming microspheres, which are evenly mixed into the clay paste.

The cow dung is processed into pore-forming microspheres, which are mixed into the clay paste to form the brick blanks. The pore-forming microspheres are vaporized and discharged during sintering of the brick blanks, and form a closed pore structure. The pore-forming microspheres are uniformly blended into the clay paste by the homogenizing device rather than by stirring the raw materials, because the pore-forming microspheres are of low strength and will break up during stirring.

(2) The kneading ejection part kneads the clay paste while homogenizing the pore-forming microspheres, so as to achieve homogenizing.

The kneading ejection part kneads the clay paste by rotating the kneading gear 41. At the same time, the granule ejection cylinder 42 provided within the kneading gear 41 rotates in the opposite direction and ejection holes aim at the ejection ports, thereby intermittently ejecting the pore-forming microspheres into the clay paste.

(3) A fluidized batcher cooperates with a material flow splitter to mix the pore-forming microspheres into the clay paste to achieve homogenizing.

The granule ejection cylinder 42 provided within the kneading gear 41 rotates in the opposite direction and the ejection holes aim at the ejection ports, thereby intermittently ejecting the pore-forming microspheres into the clay paste. On the basis of this idea, the kneading teeth are further designed as a cam-driven sliding kneading part 50, and the cams 56 are provided on the periphery of the granule ejection cylinder 42. The highest cam points 57 of the cams force the odd-numbered kneading teeth to extend and knead, while the pore-forming microspheres are ejected from the granule ejection cylinder 42 to the ejection outlet 49 and finally to the clay paste. At the same time, the reset springs 53 drive the even-numbered kneading teeth to move along the cams 56 until reaching the lowest cam points 52, so that the even-numbered kneading teeth move back to the retracted positions.

The pore-forming microsphere homogenizing device and method of the present invention firstly homogenize the pore-forming microspheres made of the cow dung into the clay paste; secondly homogenize the materials by using the kneading gear 48 and the granule ejection cylinder 42 rotating in opposite directions for kneading the clay paste while ejecting the pore-forming microspheres; and thirdly homogenize the materials by using the telescopic kneading part and the ejection cylinder together for further kneading the clay paste while ejecting the pore-forming microspheres. As a result, uniform and complete closed pores are uniformly distributed in the clay bricks, so that the strength of the clay bricks remains unchanged while clay usage is reduced.

What is claimed is:

1. A homogenizing device for uniformly doping pore-forming microspheres into clay paste, comprising:
   a concave cavity housing (20), wherein the concave cavity housing (20) comprises an annular flow channel (21); a channel inlet (22) and a channel outlet (23) in connection with the flow channel (21) are arranged on the concave cavity housing (20);
   a paste driving part (30) for driving the clay paste to pass through the flow channel (21); and
   a kneading ejection part (40) rotationally coupled in coaxial line with the flow channel (21), wherein a rotating direction of the kneading ejection part (40) is opposite to a moving direction of the clay paste, thereby intermittently ejecting the pore-forming microspheres into the clay paste while kneading the clay paste.

2. The homogenizing device, as recited in claim 1, wherein the kneading ejection part (40) comprises a kneading gear cylinder (41) and a granule ejection cylinder (42) rotating in opposite directions to each other, wherein the granule ejection cylinder (42) is arranged in a cylinder cavity of the kneading gear cylinder (41) and rotates opposite to the kneading gear cylinder (41); and a gap between the granule ejection cylinder (42) and the kneading gear cylinder (41) is smaller than a diameter of the pore-forming microspheres.

3. The homogenizing device, as recited in claim 2, wherein the concave cavity housing (20) comprises a stepped sleeve (24), wherein an outer bearing seat (24.1) and an inner bearing seat (24.2) are coaxially arranged on the stepped sleeve (24); the granule ejection cylinder (42) is rotatably arranged on the inner bearing seat (24.2), and the kneading gear cylinder (41) is rotatably arranged on the outer bearing seat (24.1); a bottom plate (26) and a cover plate (27) are respectively fastened to two ends of the stepped sleeve (24); the bottom plate (26) is provided with a first motor (45), and the cover plate (27) is mounted with a second motor (46); the kneading gear cylinder (41) is driven by and connected to the first motor (45), and the granule ejection cylinder (42) is driven by and connected to the second motor (46).

4. The homogenizing device, as recited in claim 2, wherein a plurality of ejection holes (47) are arrayed on a peripheral wall the granule ejection cylinder (42); the kneading gear cylinder (41) comprises a kneading gear (48); the kneading gear (48) has at least one ejection outlet (49) extending in a radial direction, and the ejection outlet (49) corresponds to the ejection holes (47).

5. The homogenizing device, as recited in claim 3, wherein the kneading gear cylinder (41) is provided with a plurality of sliding kneading parts (50) spaced in a circumferential direction, and the granule ejection cylinder (42) rotates opposite to the kneading gear cylinder (41) so that the sliding kneading parts (50) radially slide and telescopically knead to eject the pore-forming microspheres into the clay paste.

6. The homogenizing device, as recited in claim 5, wherein the sliding kneading parts (50) comprise a plurality of sliding holes (51) provided in the kneading gear cylinder (41), and telescopic kneading teeth (58) are provided in the sliding holes (51); reset springs (53) and limiting balls (54) are arranged between the telescopic kneading teeth (58) and the sliding holes (51); the telescopic kneading teeth (58) move between extended and retracted positions in the sliding holes (51), wherein the reset springs (53) drive the telescopic kneading teeth (58) back to the retracted positions, and the limiting balls (54) restrict the telescopic kneading teeth (58) from falling out of the sliding holes (51); the telescopic kneading teeth (58) have telescopic ejection ports (59);
   the sliding kneading parts (50) further comprise cams (56), wherein the cams (56) are provided on a periphery of the granule ejection cylinder (42); highest cam points (57) are arranged on cams corresponding to odd-numbered kneading teeth, and lowest cam points (52) are arranged on cams corresponding to even-numbered kneading teeth;
   when the granule ejection cylinder (42) rotates opposite to the kneading gear cylinder (41), the highest cam points (57) force the odd-numbered kneading teeth to extend and knead while ejection holes (47) aim at the telescopic ejection ports (59) of telescopic kneading teeth (58), which throw out the pore-forming microspheres to telescopic ejection outlet (49), so that the pore-forming microspheres are ejected into the clay paste by the kneading gear cylinder (41); meanwhile, the reset springs (53) drive the even-numbered kneading teeth to move along the cams (56) until reaching the lowest cam points (52), so that the even-numbered kneading teeth move back to the retracted positions.

\* \* \* \* \*